(12) United States Patent
Spector et al.

(10) Patent No.: US 11,928,669 B2
(45) Date of Patent: Mar. 12, 2024

(54) SYSTEMS AND METHODS FOR MOBILE WALLET PAYMENTS

(71) Applicant: JPMORGAN CHASE BANK, N.A., New York, NY (US)

(72) Inventors: Howard Spector, Street, MD (US); Eric Connolly, Wilmington, DE (US); John D Moore, Dublin, OH (US); Nancy E Hiebler, Wilmington, DE (US); Michael Naggar, Dallas, TX (US); Ayman A Hammad, Pleasanton, CA (US); Tuan Dao, Richardson, TX (US); Venkata Maranani, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/056,430

(22) Filed: Nov. 17, 2022

(65) Prior Publication Data
US 2023/0081810 A1 Mar. 16, 2023

Related U.S. Application Data

(62) Division of application No. 16/119,428, filed on Aug. 31, 2018, now Pat. No. 11,544,699.
(Continued)

(51) Int. Cl.
*G06Q 20/36* (2012.01)
*G06Q 20/22* (2012.01)
*G06Q 20/32* (2012.01)

(52) U.S. Cl.
CPC .......... *G06Q 20/36* (2013.01); *G06Q 20/227* (2013.01); *G06Q 20/3278* (2013.01)

(58) Field of Classification Search
CPC .. G06Q 20/36; G06Q 20/227; G06Q 20/3278; G06Q 20/308
(Continued)

(56) References Cited

U.S. PATENT DOCUMENTS 7,155,411 B1 * 12/2006 Blinn et al. ............... 705/40
9,830,587 B1 * 11/2017 Bell et al. ........... G06Q 20/227
705/41
(Continued)

OTHER PUBLICATIONS

Tom Anderson, Do digital wallets stiff you on reward points ?, May 29, 2015, Personal Finance, www.cnbc.com (Year: 2015).*
(Continued)

*Primary Examiner* — Scott C Anderson
*Assistant Examiner* — George N. Proios
(74) *Attorney, Agent, or Firm* — GREENBERG TRAURIG LLP

(57) ABSTRACT

Systems and methods for mobile wallet payments are disclosed. In one embodiment, in an information processing apparatus comprising at least one computer processor, a method for conducting a payment using an electronic wallet may include: (1) a mobile application receiving a selection of an alternate payment currency; the mobile application receiving a payment payload from an issuer; the mobile application providing the selection of the alternate payment currency and an identifier to the issuer; and the mobile application providing the payment payload and the identifier to a merchant host. The merchant host may communicate the identifier to the issuer, and the issuer may identify selection of the alternate payment currency based on the identifier.

15 Claims, 7 Drawing Sheets

Related U.S. Application Data

(60) Provisional application No. 62/552,506, filed on Aug. 31, 2017.

(58) Field of Classification Search
USPC .......................................................... 705/41
See application file for complete search history.

(56) References Cited

U.S. PATENT DOCUMENTS

| | | | |
|---|---|---|---|
| 11,429,971 | B1 | 8/2022 | Ouellette et al. |
| 2007/0125838 | A1* | 6/2007 | Law et al. .............. G07F 19/00 |
| | | | 235/379 |
| 2015/0026049 | A1* | 1/2015 | Theurer et al. ........ G06Q 20/36 |
| | | | 705/41 |
| 2015/0095190 | A1* | 4/2015 | Hammad et al. ... G06Q 30/0633 |
| 2015/0220914 | A1* | 8/2015 | Purves et al. .......... G06Q 20/36 |
| 2016/0055483 | A1* | 2/2016 | Liberty .............. G06Q 20/3674 |
| 2017/0017958 | A1* | 1/2017 | Scott et al. ............ G06Q 20/40 |
| 2018/0253705 | A1 | 9/2018 | Spector |

OTHER PUBLICATIONS

Consumer Federation of America, Mobile Payments, Protecting Your Privacy and Security When You Make Mobile Payments, Jan. 11, 2016, https://consumerfed.org/mobilepayments/ (Year: 2016).*
Chargeback Gurus, Loyalty Programs—Mobile Wallets on the rise, Jan. 15, 2018, www.chargebackgurus.com (Year: 2018).*
International Search Report and Written Opinion of the International Searching Authority, dated Nov. 21, 2018, from corresponding International Application No. PCT/US2018/049178.

* cited by examiner

SYSTEMS AND METHODS FOR MOBILE WALLET PAYMENTS

RELATED APPLICATIONS

This application is divisional of U.S. patent application Ser. No. 16/119,428, now U.S. Patent No., filed Aug. 31, 2018, which claims priority to U.S. Provisional Patent Application Ser. No. 62/552,506, filed Aug. 31, 2017, the disclosure of which is hereby incorporated, by reference, in its entirety.

BACKGROUND OF THE INVENTION

1. Field of the Invention

The present disclosure generally relates to systems and methods for mobile wallet payments.

2. Description of the Related Art

Making payments using mobile electronic devices has become a quick and secure way to conduct transactions. Third party mobile wallets, however, tend to be inflexible to user payment preferences.

SUMMARY OF THE INVENTION

Systems and methods for mobile wallet payments are disclosed. In one embodiment, in an information processing apparatus comprising at least one computer processor, a method for conducting a payment using an electronic wallet may include: (1) a mobile application receiving a selection of an alternate payment currency; (2) the mobile application receiving a payment payload from an issuer; and (3) the mobile application communicating the payment payload and the selection of the alternate payment currency to a merchant host. The merchant host may communicate the selection of the alternate payment currency as a Customer End Data (CED) field, and the issuer may identify the selection of the alternate payment currency based on the CED

FIELD

In one embodiment, the method may further include decoding the payment payload to present it optically or by Near-Field Communication ("NFC").

In one embodiment, the alternate payment currency may be to pay with points.

In one embodiment, the payment payload may comprise a cryptogram.

In one embodiment, the mobile application may include a third party application, and the mobile application may be authenticated with the issuer using a Software Developer Kit ("SDK") or an Application Programable Interface ("API").

In one embodiment, the selection of the alternate payment currency may be received by the mobile application, may be retrieved from a customer profile, may be based on a prior selection in a prior transaction, etc.

According to another embodiment, in an information processing apparatus comprising at least one computer processor, a method for conducting a payment using an electronic wallet may include: (1) a mobile application receiving a selection of an alternate payment currency; the mobile application receiving a payment payload from an issuer; the mobile application providing the selection of the alternate payment currency and an identifier to the issuer; and the mobile application providing the payment payload and the identifier to a merchant host. The merchant host may communicate the identifier to the issuer, and the issuer may identify selection of the alternate payment currency based on the identifier.

In one embodiment, the method may further include decoding the payment payload to present it optically or by NFC.

In one embodiment, the alternate payment currency may be to pay with points.

In one embodiment, the payment payload may comprise a cryptogram.

In one embodiment, the mobile application may include a third party application, and the mobile application may be authenticated with the issuer using a SDK or an API.

In one embodiment, the selection of the alternate payment currency may be received by the mobile application, may be retrieved from a customer profile, may be based on a prior selection in a prior transaction, etc.

According to another embodiment, in an information processing apparatus comprising at least one computer processor, a method for conducting a payment using an electronic wallet may include: (1) a mobile application receiving a selection of an alternate payment currency; (2) the mobile application receiving a payment payload from an issuer; (3) the mobile application inserting a value representing the selection of the alternate payment currency into a transaction field; and (4) the mobile application providing the payment payload and the identifier to a merchant host. The merchant host may communicate the identifier to the issuer, and the issuer may identify the selection of the alternate payment currency based on the value in the transaction field.

In one embodiment, the value may be a hash of a value representing the selection of the alternate payment currency.

In one embodiment, the alternate payment currency may be to pay with points.

In one embodiment, the selection of the alternate payment currency is received by the mobile application, is retrieved from a customer profile, is based on a prior selection in a prior transaction, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for mobile wallet payments.

The following disclosures are hereby incorporated, by reference, in their entireties: U.S. Patent Application Ser. No. 62/465,683; U.S. Patent Application Ser. No. 62/469,135; U.S. Patent Application Ser. No. 62/487,025; U.S. Patent Application Ser. No. 62/472,174; U.S. patent application Ser. No. 15/612,167; U.S. Patent Application Ser. No. 62/345,390; U.S. Patent Application Ser. No. 62/512,420.

Figure 1:
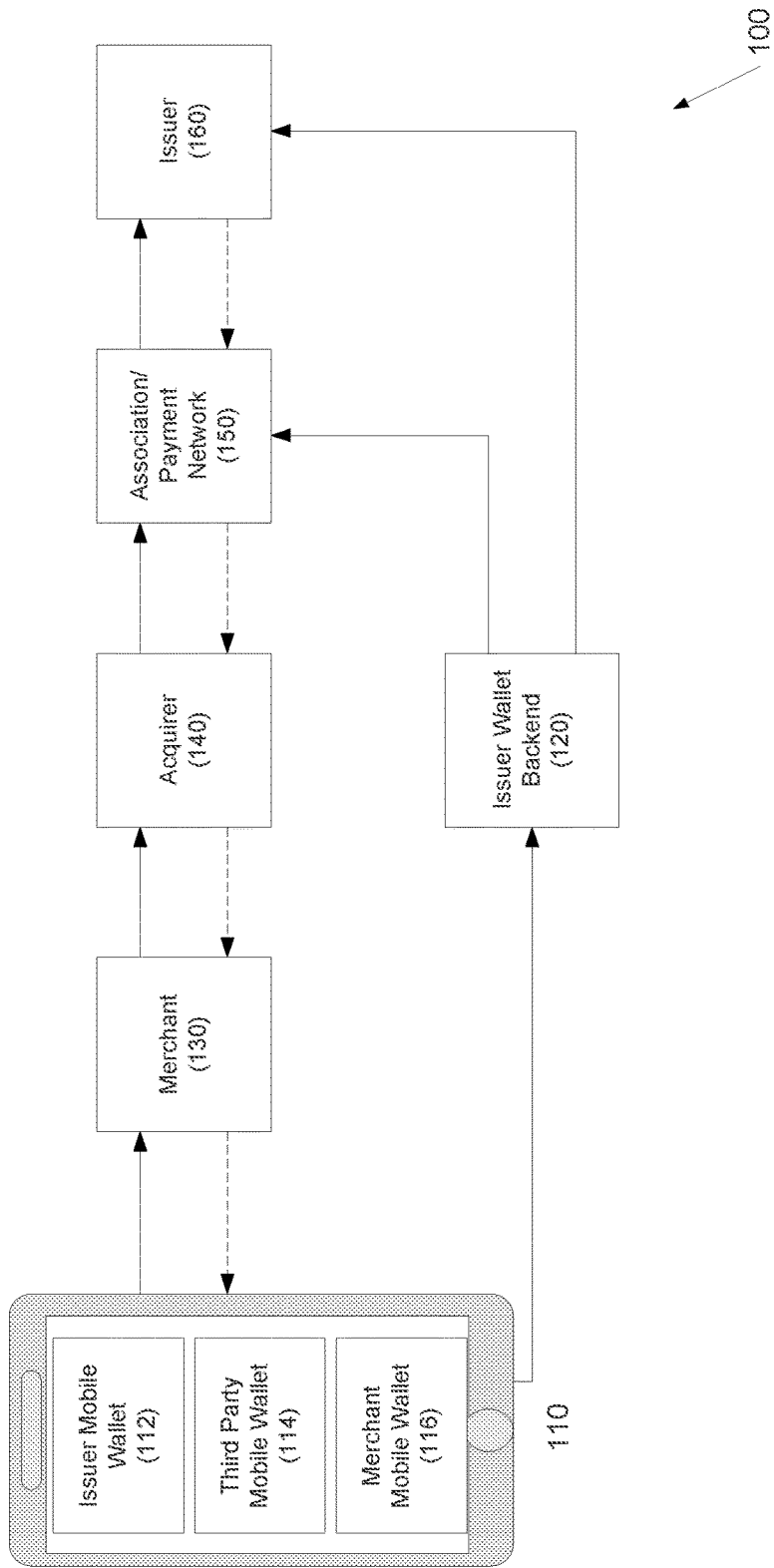
FIG. 1 depicts a system for mobile wallet payments according to one embodiment.

Referring to FIG. 1, a system for mobile wallet payments is disclosed according to one embodiment. System 100 may include, for example, electronic device 110, which may be any suitable electronic device (e.g., smart phone, tablet computer, notebook computer desktop computer, Internet of Things (IoT) appliance, etc. Electronic device 110 may execute one or more computer applications, such as issuer mobile wallet 112 (e.g., Chase Pay), third party mobile wallet 114 (e.g., Apple Pay), merchant mobile wallet 116, mobile payment applications (not shown), etc. In one embodiment, the mobile wallets may be mobile wallet apps, or an app provided by the sponsor (e.g., an issuer mobile app).

Merchant 130 may be any suitable merchant, and may interact with electronic device 110 with a point of transaction device (not shown), such as a point of sale terminal, a webpage, etc.

Acquirer 140 may function as an acquirer for merchant 130, and may communicate with issuer 160 using card association and/or payment network. In one embodiment, Acquirer 140 may be any third party that may be between merchant 130 and the association/payment network(s) 150 for the purpose of processing payment transactions.

Issuer wallet backend 120 may communicate with issuer mobile wallet 112. In one embodiment, issuer wallet backend 120 may be connected to token service provider functionality that may be provided by association/payment network 150.

Association/payment network 150 may be one entity, or it may be functionality provided by a plurality of entities.

Figure 2:
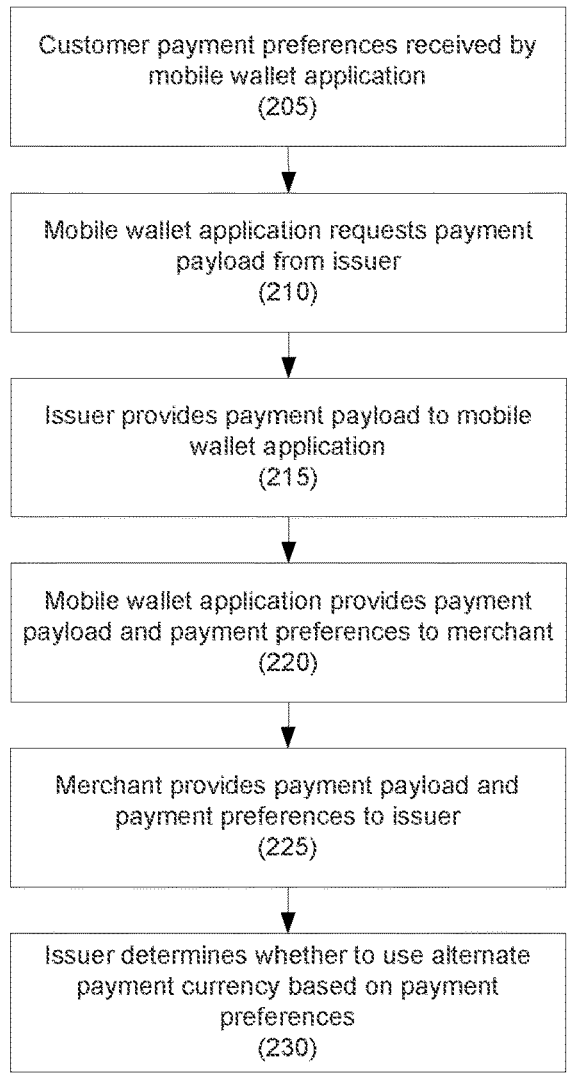
FIG. 2 depicts a method for mobile wallet payments according to one embodiment.

Referring to FIG. 2, a method for mobile wallet payments is disclosed according to one embodiment.

In step 205, a mobile wallet application, executed by a mobile electronic device, such as a smart phone, tablet computer, desktop computer, Internet of Things (IoT) appliance, etc., may receive a customer's payment preference, such as a preference to use an alternate payment currency, may be received by an issuer mobile wallet. In one embodiment, the mobile wallet application may be an issuer mobile wallet application, a third party mobile application, a web-based application, etc.

In one embodiment, the payment preference may be received at the application (e.g., using a toggle), from a customer profile in the issuer mobile wallet, from the issuer, based on machine learning (e.g., how similar transactions were handled), based on a benefit and/or discount, etc.

In one embodiment, if using a third party wallet, the third party wallet may expose the alternate payment currency option "toggle" and allow the customer to use the issuer's payment application through the third party wallet to pay using the alternate currency.

In one embodiment, a third party wallet may use a SDK or API to communicate with the issuer.

In one embodiment, the payment preference may be entered before the transaction, during the transaction, or post-transaction.

In step 210, the mobile wallet application may request and obtain a payment payload from the issuer.

As used herein, a payment payload may include data that allows a merchant to process the payment transaction. Examples of such data include account information, pointers or references to the account information such as tokenized account information, cryptographic data and transaction specific data, issuer discretionary data, industry data that may be needed based on the payment scheme, technology or interface and any additional information that may be needed to complete the transaction execution on the merchant side including contact information or related data.

In step 215, the issuer may provide the payment payload (e.g., a machine readable code (e.g., a QR code), a cryptogram, a key, etc.) to the mobile wallet application.

In step 220, the mobile wallet application may provide the payment payload and the customer payment preference to the merchant. In one embodiment, the payment payload and/or the payment preferences may be provided optically, by NFC, etc. In one embodiment, the mobile wallet application may decode the payment payload to present it as a QR code, by NFC, etc.

In step 225, the merchant host may enter the customer payment preference into a Customer End Data, or "CED" field, and may provide this, along with the payment payload, to the issuer.

In one embodiment, the merchant host may generate the CED field. In another embodiment, the merchant host may provide the information for the CED field to the issuer.

In one embodiment, a third party wallet may be involved because the third party has control on the payment process for its platform.

In step 230, the issuer may then use the CED and/or cryptogram to determine if payment using an alternate currency was selected. In another embodiment, the transaction may be matched using transaction time, with a wallet identifier, etc.

Examples of matching are disclosed in U.S. Provisional Patent Application Ser. No. 62/703,164, filed Jul. 25, 2018, the disclosure of which is hereby incorporated, by reference, in its entirety.

Figure 3:
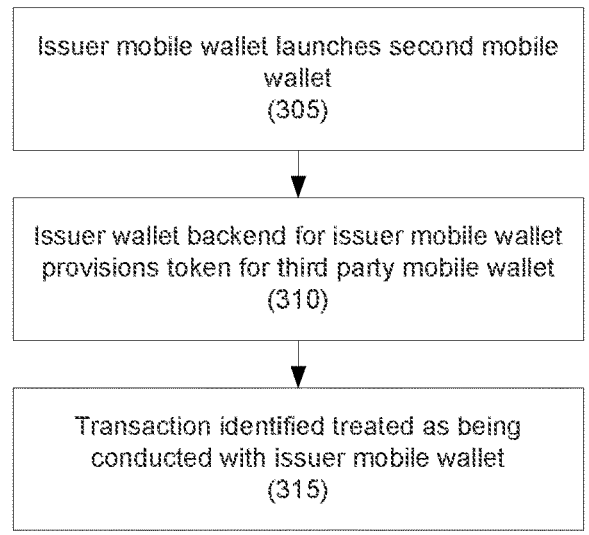
FIG. 3 depicts a method for mobile wallet payments according to one embodiment.

Referring to FIG. 3, a method for mobile wallet payments is disclosed according to another embodiment. In one embodiment, NFC may be implemented in any suitable operating system, such as Android, iOS, etc.

In one embodiment, in step 305, an issuer mobile wallet (e.g., Chase Pay) may launch a third party mobile wallet (e.g., Apple Pay).

In step 310, in-application provisioning may be performed to provide a token from the issuer mobile wallet to the third party mobile wallet.

In step 315, tracking may be provided so that the merchant may be identified along with the mobile wallet that was used to conduct the transaction. For example, one or more flags or indicators may be used to identify the transaction as being conducted with the issuer mobile wallet and/or the third party mobile wallet. For example, in one embodiment, data may be provided from the issuer mobile wallet to the issuer to identify that the issuer mobile wallet was used through the third party mobile wallet. In another embodiment, the third party may integrate certain features that allows for the gathering and passage of information to the issuer via the acquirer and payment network. In another embodiment, the network processing may be provided that supports the identification of the issuer wallet used with the third party wallet.

Figure 4:
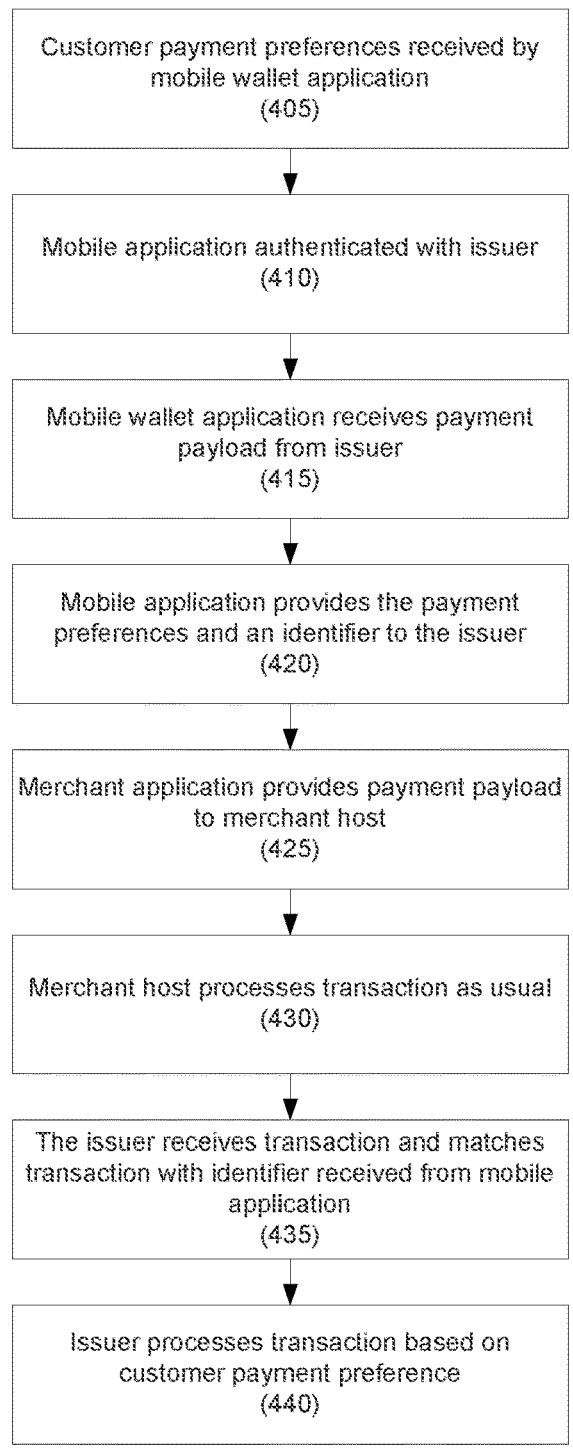
FIG. 4 depicts a method for mobile wallet payments according to one embodiment.

Referring to FIG. 4, a method for mobile wallet payments is disclosed according to another embodiment. In one embodiment, a user may use a third party application (e.g., a merchant app) to make an in-app purchase (e.g., a reload for a stored value card, a purchase, etc.) using the issuer mobile wallet.

In step 405, a mobile wallet application, executed by a mobile electronic device, such as a smart phone, tablet computer, desktop computer, Internet of Things (IoT) appliance, etc., may receive a customer's payment preference, such as a preference to use an alternate payment currency, may be received by an issuer mobile wallet. In one embodiment, the mobile wallet application may be an issuer mobile wallet application, a third party mobile application, a web-based application, etc.

In one embodiment, the payment preference may be received at the application (e.g., using a toggle), from a customer profile in the issuer mobile wallet, from the issuer, based on machine learning (e.g., how similar transactions were handled), based on a benefit and/or discount, etc.

In one embodiment, if using a third party wallet, the third party wallet may expose the alternate payment currency option "toggle" and allow the customer to use the issuer's payment application through the third party wallet to pay using the alternate currency.

In one embodiment, a third party wallet may use a SDK or API to communicate with the issuer.

In one embodiment, the payment preference may be entered before the transaction, during the transaction, or post-transaction.

In step 410, the mobile wallet application may authenticate with the issuer (e.g., an issuer wallet backend). If the mobile wallet application is a third party application, the mobile wallet application may use a SDK, APIs, etc. to authenticate The mobile wallet application may establish a session id and account index with the issuer.

In step 415, mobile wallet application may receive a payment payload (e.g., machine readable code (e.g., a QR code), a cryptogram, a key, etc.) from the issuer.

In step 420, the mobile application may provide the payment preferences and an identifier to the issuer. In one embodiment, the transaction identifier may include some or all of the payment payload, a transaction identifier, etc.

In step 425, the mobile wallet application may provide the payment payload to the merchant. In one embodiment, the payment payload and/or the payment preferences may be provided optically, by NFC, etc. In one embodiment, the mobile wallet application may decode the payment payload to present it as a QR code, by NFC, etc.

In one embodiment, if using a third party wallet that is integrated with an issuer mobile wallet, the third party wallet may provide data for the issuer mobile wallet and transaction information to the merchant. In one embodiment, the merchant wallet may be linked to provide information on the customers actions back to the wallet provider. An example of such is provided in U.S. patent application Ser. No. 15/908,203, the disclosure of which is hereby incorporated, by reference, in its entirety.

For example, the merchant application and/or the merchant mobile wallet may provide information for customer's alternate currency selection, to identify that an issuer mobile wallet (e.g., Chase Pay) token was used by the merchant app or mobile wallet.

In step 430, the merchant host may process the transaction as usual to the issuer. In one embodiment, the transaction may flow from the merchant host, to the merchant acquirer, to the payment network, to the issuer. In one embodiment, an identifier may be communicated with the transaction.

In step 435, the issuer may receive the transaction from the merchant host, and may match the identifier received from the merchant host with the identifier received from the mobile application to identify retrieve the payment preferences.

In step 440, the issuer may process the transaction according to the customer payment preferences. In one embodiment, the match may be a direct match (e.g., the identifiers are matched), a time-based match (e.g., transactions within a certain time window), and/or based on another code. For example, an authorization code received by the merchant from the network may be used in post-authorization catchup matching.

Figure 5:
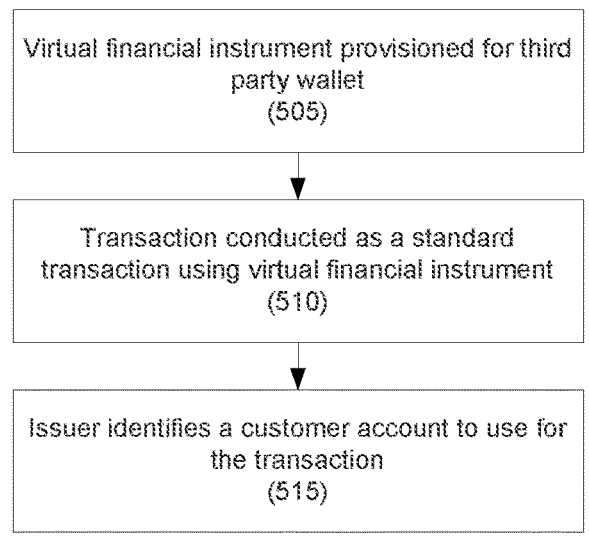
FIG. 5 depicts a method for mobile wallet payments according to one embodiment.

Referring to FIG. 5, a method for mobile wallet payments is disclosed according to another embodiment. In step 505, a virtual financial instrument, such as a virtual credit card, may be provisioned to a third party wallet using, for example, in-app provisioning in the issuer mobile wallet.

In another embodiment, the virtual financial instrument may be a pseudo-account number that may be linked or associated with an actual account that may be static and/or dynamic.

In another embodiment, instead of a virtual financial instrument, real financial instrument may be provisioned and may be associated with one or more financial instruments.

In step 510, a transaction may be conducted using the virtual financial instrument, or the real financial instrument, and may proceed as a standard, or business as usual transaction until the issuer receives the transaction.

In step 515, the issuer may identify an account for the transaction. For example, the issuer may identify a customer-selected account associated with the virtual financial instrument, a default account, or may select an account based on rules. Thus, even though a transaction may be conducted with a virtual financial instrument, the actual account used for the transaction may differ.

In another embodiment, a real financial instrument may be associated with one or more other accounts, and the issuer may identify a different account other than the account associated with the real financial instrument.

In one embodiment, the account used may change on a transaction-by-transaction basis as desired, and may be tied to any number of products (e.g., credit, debit, alternate currencies, etc.).

Figure 6:
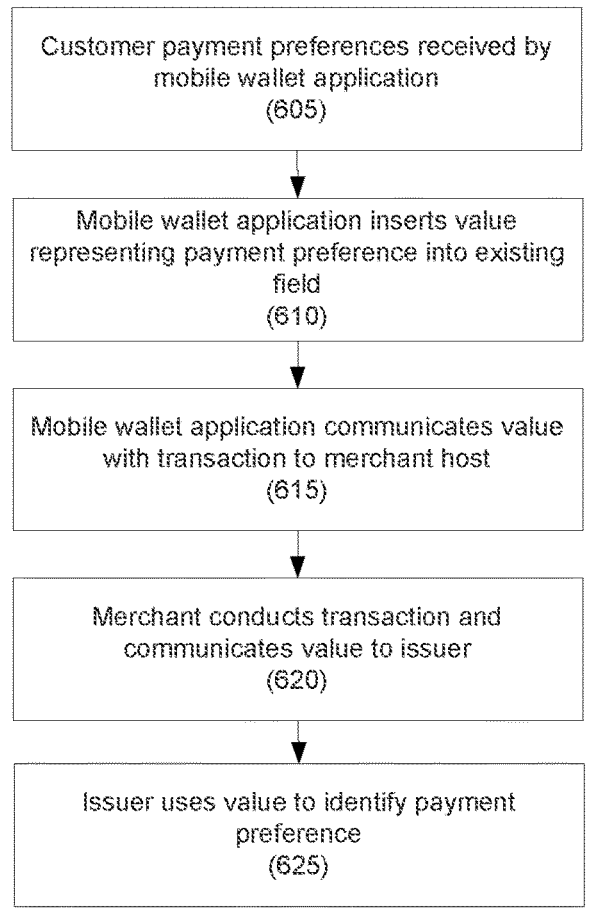
FIG. 6 depicts a method for mobile wallet payments according to one embodiment.

Referring to FIG. 6, a method for mobile wallet payments is disclosed according to another embodiment.

In step 605, a mobile wallet application, executed by a mobile electronic device, such as a smart phone, tablet computer, desktop computer, Internet of Things (IoT) appliance, etc., may receive a customer's payment preference, such as a preference to use an alternate payment currency, may be received by an issuer mobile wallet. In one embodiment, the mobile wallet application may be an issuer mobile wallet application, a third party mobile application, a web-based application, etc.

In one embodiment, the payment preference may be received at the application (e.g., using a toggle), from a customer profile in the issuer mobile wallet, from the issuer, based on machine learning (e.g., how similar transactions were handled), based on a benefit and/or discount, etc.

In one embodiment, if using a third party wallet, the third party wallet may expose the alternate payment currency option "toggle" and allow the customer to use the issuer's payment application through the third party wallet to pay using the alternate currency.

In one embodiment, a third party wallet may use a SDK or API to communicate with the issuer.

In one embodiment, the payment preference may be entered before the transaction, during the transaction, or post-transaction.

In step 610, the mobile wallet application may insert a value into an existing field that may be communicated with a transaction to indicate the customer's payment preference, such as an intent to use an alternate payment currency. For example, a value representing the payment preferences, or a hash of the value representing the payment preferences, may be inserted into any suitable field. Examples include the CVV or CVV2 field, a Dynamic Token Verification Value (DTVV), or any other suitable field.

In step 615, the mobile wallet application may communicate the value with other payment information.

In step 620, the merchant may conduct the transaction and communicate the value with the transaction.

In step 625, the issuer may receive transaction and value, and may use the value to identify the customer payment preferences. In one embodiment, the value may be a direct match, a time-based match (e.g., transactions within a certain time window), and/or based on another code.

In one embodiment, an authorization code received by the merchant from the network may be used in post-authorization catchup matching.

Figure 7:
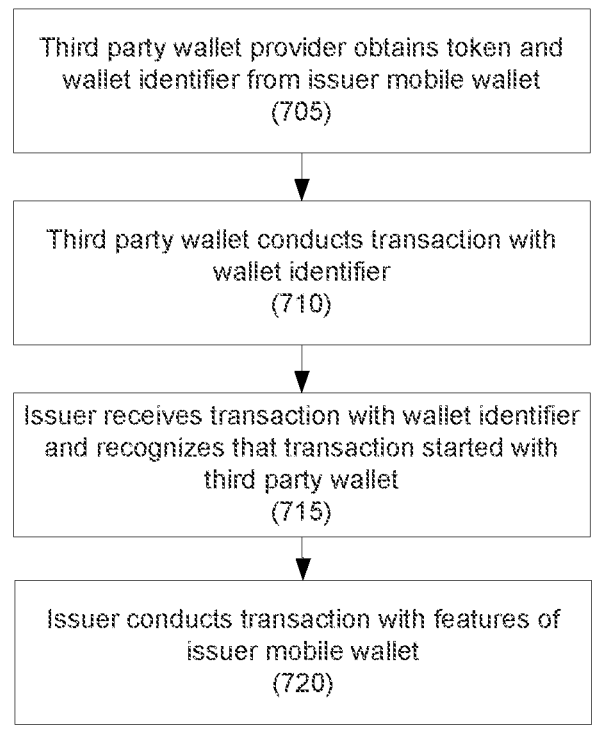
FIG. 7 depicts a method for mobile wallet payments according to one embodiment.

Referring to FIG. 7, a method for mobile wallet payments is disclosed according to another embodiment. In one embodiment, a third party wallet provider may conduct a transaction using a token from an issuer mobile wallet, such as Chase Pay. Because the third party wallet provider is conducting the transaction with the merchant, the source of the transaction (e.g., the identity of the third party wallet) may not be known.

Thus, in step 705, in one embodiment, using one or more APIs, or a SDI, the third party wallet provider may obtain a token from the mobile wallet, which may also provide a wallet identifier to the third party wallet provider. In another embodiment, the issuer may contractually obligate the third party wallet provider to identify the third party wallet provider. In still another embodiment, the Token Requestor ID ("TRI") value may be used.

In step 710, when the third party wallet provider conducts the transaction, the wallet identifier or TRI value is passed. This indicates to the issuer that the transaction was started with the third party wallet. In one embodiment, the third party wallet provider may pass a different value (e.g., a wallet identifier) to different the third party wallet provider from the mobile wallet when it is using the issuer mobile wallet token.

In step 715, the issuer may receive the transaction with the wallet identifier or TRI, and may recognize that the transaction started with the third party wallet.

In step 720, the issuer may conduct the transaction with the same features and/or benefits of a transaction that was conducted with the issuer's mobile wallet.

Although several embodiments are disclosed herein, it should be recognized that they are not exclusive, and elements of one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a payment using an electronic wallet, comprising:
   receiving, by an issuer mobile wallet application executed by a mobile electronic device, a selection of a pay with points option associated with a financial instrument;
   communicating, by the issuer mobile wallet application, a request for a payment payload for the financial instrument to an issuer backend for the issuer mobile wallet application over a first communication network;
   receiving, by the issuer mobile application, the payment payload from the issuer backend over the first communication network;
   providing, by the mobile application, the selection of the pay with points option and an identifier to the issuer backend; and
   providing, by the mobile wallet application, the payment payload and the identifier to a merchant host;
   wherein the merchant host is configured to communicate a transaction comprising the identifier and the payment payload to the issuer backend over a second communication network; and
   wherein the issuer backend is configured to identify the selection of the pay with points option for the transaction based on the identifier.

2. The method of claim 1, further comprising:
   decoding, by the issuer mobile application, the payment payload to present it optically or by NFC.

3. The method of claim 1, wherein the payment payload comprises a cryptogram.

4. The method of claim 1, wherein the selection of the pay with points option is retrieved from a customer profile.

5. The method of claim 1, wherein the selection of the pay with points option is based on a prior selection in a prior transaction.

6. A system, comprising:
   an electronic device comprising a computer processor and a memory storing a mobile wallet application;
   a merchant host;
   an issuer wallet backend; and
   an issuer;
   wherein the mobile wallet application is configured to:
      receive a selection of a pay with points option associated with a financial instrument for a transaction with a merchant;
      communicate the selection of the pay with points option and a request for a payment payload for the financial instrument to an issuer backend for the issuer mobile wallet application over a first communication network;
      receive the payment payload from the issuer backend over the first communication network; and
      provide the pay with points option and an identifier to the issuer backend; and
      provide the payment payload and the identifier to a merchant host;
   wherein the merchant host is configured to communicate a transaction comprising the identifier and the payment payload to the issuer backend over a second communication network; and
   wherein the issuer backend is configured to identify the selection of the pay with points option for the transaction based on the identifier.

7. The system of claim 6, wherein the wherein the issuer mobile application decodes the payment payload to present it optically or by NFC.

8. The system of claim 6, wherein the payment payload comprises a cryptogram.

9. The system of claim 6, wherein the issuer mobile wallet receives the selection of the pay with points option from a customer profile.

10. The system of claim 6, wherein the selection of the pay with points option is based on a prior selection in a prior transaction.

11. A non-transitory computer readable storage medium, including instructions stored thereon, which when read and executed by one or more computer processors, cause the one or more computer processors to perform steps comprising:
   receiving a selection of a pay with points option associated with a financial instrument;
   communicating a request for a payment payload for the financial instrument to an issuer backend over a first communication network;
   receiving the payment payload from the issuer backend over the first communication network;
   providing the selection of the pay with points option and an identifier to the issuer backend; and
   providing the payment payload and the identifier to a merchant host;
   wherein the merchant host is configured to communicate a transaction comprising the identifier and the payment payload to the issuer backend over a second communication network; and
   wherein the issuer backend is configured to identify the selection of the pay with points option for the transaction based on the identifier.

12. The non-transitory computer readable storage medium of claim 11, further including instructions stored thereon, which when read and executed by one or more computer processors, cause the one or more computer processors to decode the payment payload to present it optically or by NFC.

13. The non-transitory computer readable storage medium of claim 11, wherein the payment payload comprises a cryptogram.

14. The non-transitory computer readable storage medium of claim 11, wherein the selection of the pay with points option is retrieved from a customer profile.

15. The non-transitory computer readable storage medium of claim 11, wherein the selection of the pay with points option is based on a prior selection in a prior transaction.

* * * * *